(12) United States Patent
Santini et al.

(10) Patent No.: US 12,281,579 B2
(45) Date of Patent: Apr. 22, 2025

(54) TURBOMACHINERY PLANT TO MAXIMIZE THE POWER GENERATED BY AN ELECTRICAL REVERSIBLE MACHINE

(71) Applicant: NUOVO PIGNONE TECNOLOGIE—SRL, Florence (IT)

(72) Inventors: Marco Santini, Florence (IT); Marco Baldini, Florence (IT); Andrea Gabbrielli, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/558,083

(22) PCT Filed: Apr. 22, 2022

(86) PCT No.: PCT/EP2022/025172
§ 371 (c)(1),
(2) Date: Oct. 30, 2023

(87) PCT Pub. No.: WO2022/228723
PCT Pub. Date: Nov. 3, 2022

(65) Prior Publication Data
US 2024/0240568 A1    Jul. 18, 2024

(51) Int. Cl.
*F01D 15/10* (2006.01)
*F02C 3/113* (2006.01)
(Continued)

(52) U.S. Cl.
CPC .............. *F01D 15/10* (2013.01); *F02C 3/113* (2013.01); *F02C 7/36* (2013.01); *F04D 25/04* (2013.01);
(Continued)

(58) Field of Classification Search
CPC .. F01D 15/10; F02C 3/113; F02C 6/16; F02C 7/36; F04D 25/04; F04D 25/06;
(Continued)

(56) References Cited

U.S. PATENT DOCUMENTS

2003/0005699 A1    1/2003  Walpita
2010/0242495 A1    9/2010  Demoss et al.
(Continued)

FOREIGN PATENT DOCUMENTS

WO    2017/059897 A1    4/2017
WO    WO-2021018412 A1 *  2/2021 ............. F04D 25/16

OTHER PUBLICATIONS

Variable Frequency Drives, "VFD for Compressor in Oil and Gas Industry," (2021).

*Primary Examiner* — Loren C Edwards
(74) *Attorney, Agent, or Firm* — Paul Frank + Collins P.C.

(57) ABSTRACT

A turbomachinery plant is conceived to maximize the power generated by an electrical reversible machine when works as a generator, by reducing the power absorbed by a compressor connected to the electrical reversible machine. The compressor is connected to an antisurge circuit included in the turbomachinery plant, as well as to a suction unit by a first line and to a gas collection unit by a second line and the turbomachinery plant comprises a gas depressurizing compressor so that, when in use, an amount of gas sucked by the gas depressurizing compressor moves from the antisurge circuit to the gas depressurizing compressor and the compressor rotates encountering less resistance and absorbing less power and the power generated by the electrical reversible machine is maximized.

15 Claims, 2 Drawing Sheets

(51) Int. Cl.
    *F02C 7/36*           (2006.01)
    *F04D 25/04*         (2006.01)
    *F04D 25/06*         (2006.01)
    *F04D 27/02*         (2006.01)

(52) U.S. Cl.
    CPC ............. *F04D 25/06* (2013.01); *F04D 27/02* (2013.01); *F05D 2220/32* (2013.01); *F05D 2220/76* (2013.01); *F05D 2270/101* (2013.01)

(58) Field of Classification Search
    CPC .. F04D 25/16; F05D 2220/32; F05D 2220/76; F05D 2270/101
    See application file for complete search history.

(56) References Cited

U.S. PATENT DOCUMENTS

| | | |
|---|---|---|
| 2012/0006411 A1 | 1/2012 | Kurz et al. |
| 2016/0177822 A1 | 1/2016 | Howes et al. |
| 2018/0058320 A1 | 3/2018 | Macnaghten |
| 2020/0075978 A1 | 3/2020 | Zheng et al. |

\* cited by examiner

TURBOMACHINERY PLANT TO MAXIMIZE THE POWER GENERATED BY AN ELECTRICAL REVERSIBLE MACHINE

TECHNICAL FIELD

The present disclosure concerns a turbomachinery plant to maximize the power generated by an electrical reversible machine.

Particularly, the present disclosure concerns the structure of the turbomachinery plant comprising a gas turbine module, a compressor (called process compressor) and a variable frequency drive electric unit, the latter comprising in turn an electrical reversible machine, wherein such structure is designed and conceived to increase the resistant torque of the electrical reversible machine and decrease the resistant torque of the compressor in such a way that the power absorbed by the compressor is as low as possible and the power generated by the electrical reversible machine is maximized.

More particularly, the structure of such plant is designed and conceived for a mechanical drive hybrid gas turbine.

Background Art

The gas turbine hybridization concept is applicable to mechanical drive application on new units or as upgrade on existing trains. It leverages the wide range capability synergy that a gas turbine in combination with a variable frequency drive electric unit can offer. The variable frequency drive electric unit comprises an electrical reversible machine and a VFD control panel for the electrical reversible machine.

The electrical reversible machine can supply power to a gas turbine so as to work as helper device for the gas turbine or can absorb power from the gas turbine so as to work as a generator to produce power.

When the electrical reversible machine works as a generator and it is necessary to generate the maximum power, the resistant torque of the electrical reversible machine is increased automatically by the VFD control panel of the electrical reversible machine until the speed of the compressor (i.e. a process compressor) decreases to a minimum value substantially equally to the 50% of the speed nominal value of the compressor (and then also of the electrical reversible machine connected to the compressor). Such minimum value represents a balance point where the electrical reversible machine generates the maximum power and the compressor absorbs the "minimum power".

However, although the speed of the compressor is decreased and the amount of power absorbed by the compressor is considered minimal, the value of such amount of power is still a significant value and is substantially equal to the 10% of the nominal value of the power absorbed by the compressor itself.

As a result, the amount of power absorbed by the compressor affects the maximum power that can be generated by the electrical reversible machine. Indeed, if the power supplied by the gas turbine is equal to the sum of the power absorbed by the compressor and the power generated by the electrical reversible machine, the greater the power absorbed by the compressor, the lower the power generated by the electrical reversible machine.

Accordingly, a turbomachinery plant conceived to maximize the power generated by an electrical reversible machine and to minimize the power absorbed by the compressor is welcomed in the technology of turbomachinery, particularly when a mechanical drive gas turbine is used in the turbomachinery plant.

SUMMARY

In one aspect, the subject matter disclosed herein is directed to a turbomachinery plant comprising a variable frequency drive electric unit and a compressor, connected to the electrical reversible machine, an antisurge circuit, as well as a suction unit and a collection unit.

The variable frequency drive electric unit comprises an electrical reversible machine capable of supplying power.

The compressor is connected to the electrical reversible machine.

A first line connects a suction unit to the compressor and a second line connects the compressor to the gas collection unit. A first isolating valve is arranged on the first line and a second isolating valve is arranged on the second line.

The antisurge circuit comprises a third line, connecting the first line to the second line and an antisurge valve is arranged on the third line.

The turbomachinery comprises a gas depressurizing compressor with an inlet and an outlet, wherein the gas depressurizing compressor is configured to suck an amount of gas through the inlet, to decrease the pressure of the amount of gas and to eject the amount of gas through the outlet. A fourth line connects the second line to the inlet of the gas depressurizing compressor and a first on/off valve is arranged on the fourth line movable between an open state to allow the passage of an amount of gas toward the gas depressurizing compressor and a closed state to prevent the passage of an amount of gas toward the gas depressurizing compressor.

A central control unit is connected to the first and second isolating valves, the antisurge valve, the first on/off valve and is configured to close the first isolating valve and the second isolating valve and to open the antisurge valve so that an amount of gas flows substantially only in the antisurge circuit, and to open the first on/off valve and to activate the gas depressurizing compressor, so that an amount of gas sucked by the gas depressurizing compressor moves from the antisurge circuit to the gas depressurizing compressor, the compressor rotates encountering less resistance and absorbing less power and the power generated by the electrical reversible machine is maximized.

In another aspect of the invention, the antisurge circuit can comprise a cooler device and the central control unit is connected to the cooler device and is configured to activate the cooler device. The cooler device can be configured and sized to dissipate a predetermined quantity of heat when the compressor is in use.

In another aspect of the invention, the turbomachinery plant comprises a first control valve arranged on a sixth line connecting the first line to the third line and movable between an open state to allow the passage of an amount of gas from the suction unit to the compressor, and a closed state to prevent the passage of an amount of gas from the suction unit to the compressor, as well as a second control valve arranged on a seventh line connecting the outlet of the gas depressurizing compressor to the second line and movable between an open state to allow the passage of an amount of gas from the compressor to the collection unit and a closed state to prevent the passage of an amount of gas from the compressor to the collection unit.

A measurement and control temperature device is connected to the third line between the cooler device and the inlet of the compressor and is configured to measure and control a temperature value referred to the amount of gas in the antisurge circuit.

The central control unit is connected to the first control valve and the second control valve and to the first measurement and control temperature device and to storage means and is configured to: store in the storage means a predetermined temperature value, acquire the temperature value from a measurement and control temperature device, and adjust the opening of the first control valve and the opening of the second control valve, when the temperature value measured by the measurement and control temperature device is greater than the predetermined temperature value, in such a way that a first amount of gas having a first temperature enters the antisurge circuit through the first control valve and a second amount of gas having a second temperature exits the antisurge circuit, enters the gas depressurizing compressor, exits the gas depressurizing compressor and reaches the second line through the second control valve. The second amount of gas is equal to the first amount of gas and the second temperature is greater than the first temperature.

The present invention is also directed to a method for maximizing the power generated by an electrical reversible machine of a turbomachinery plant. In particular, the method comprises the following steps: closing the first isolating valve and the second isolating valve and opening the antisurge valve, so that an amount of gas flows substantially only in the antisurge circuit, and opening the first on/off valve and activating the gas depressurizing compressor, so that an amount of gas sucked by the gas depressurizing compressor moves from the antisurge circuit to the gas depressurizing compressor, the compressor rotates encountering less resistance and absorbing less power and the power generated by the electrical reversible machine is maximized.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In the field of power production, a turbomachinery plant comprises in combination a gas turbine, a compressor (called process compressor) and an electrical reversible machine capable of supplying power so as to work as helper device of the gas turbine or absorbing power so as to work as generator. The present disclosure is directed to the case when the electrical reversible machine works as a generator to produce the maximum power required by the needs. Since the compressor absorbs a certain amount of power also when its speed reaches the minimum value, it is necessary to reduce this amount of power as much as possible to maximize the power generated by the electrical reversible machine.

The present subject matter is thus directed to a turbomachinery plant configured to maximize the power generated by the electrical reversible machine by considerably reducing the power absorbed by the compressor connected to the electrical reversible machine. The power absorbed by the compressor is reduced by about an order of magnitude compared to the power absorbed by a compressor in a turbomachinery plant of known type.

Particularly, the structure of the turbomachinery plant is designed and conceived to substantially create a "vacuum condition" for the compressor so that the compressor absorbs less power because encounters less resistance. In this way, it is possible to maximize the power generated by the electrical reversible machine.

As a result of such condition, it is possible to increase the number of revolutions of the electrical reversible machine, so that the capability of the electrical reversible machine to supply power is increased.

Figure 1:
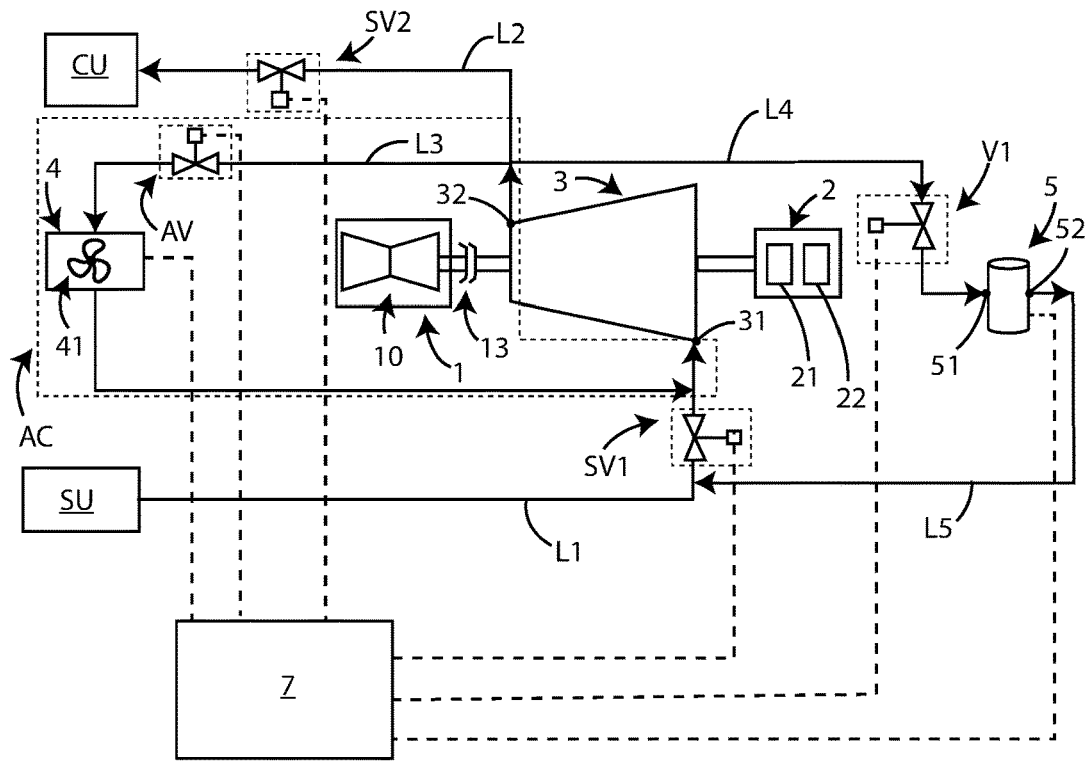
FIG. 1 illustrates a schematic view of a turbomachinery plant according to a first embodiment.

Reference is now made to the drawings and particularly to FIG. 1 that shows a first embodiment of the turbomachinery plant according to the invention.

The turbomachinery plant comprises a gas turbine module 10 comprising a gas turbine 1, a variable frequency drive electric unit 2 comprising an electrical reversible machine 21 capable of supplying power and a compressor 3 (called process compressor), connected to the electrical reversible machine 21 and the gas turbine module 10.

In particular, the compressor 3 has an inlet 31 and an outlet 32.

Furthermore, a suction unit SU is connected to the inlet 31 of the compressor 3 by means of a first line L1 and a collection unit CU is connected to the outlet 32 of the compressor 3 by means of a second line L2.

The turbomachinery plant comprises a first isolating valve SV1 arranged on the first line L1 and a second isolating valve SV2 arranged on the second line L2, as well as an antisurge circuit AC comprising a third line L3 connecting the first line L1 to the second line L2 and an antisurge valve AV arranged on the third line L3.

The first isolating valve SV1 is movable between an open state, wherein it allows the passage of an amount of gas from the suction unit SU to the compressor 3, and a closed state, wherein it prevents the passage of an amount of gas from the suction unit SU to the compressor 3.

The second isolating valve SV2 is movable between an open state, wherein it allows the passage of an amount of gas from the compressor 3 to the collection unit CU, and a closed state, wherein it prevents the passage of an amount of gas from the compressor 3 to the collection unit CU.

In particular, the turbomachinery plant comprises:
a gas depressurizing compressor 5 having an inlet 51 and an outlet 52 and configured to suck an amount of gas through the inlet 51, to decrease the pressure of the amount of gas and to eject the amount of gas through the outlet 52;
a fourth line L4 connecting the second line L2 to the inlet 51 of the gas depressurizing compressor 5, so that the gas depressurizing compressor 5 is connected to the antisurge circuit AC;
a first on/off valve V1 arranged on the fourth line L4 and movable between an open state, so as to allow the passage of an amount of gas toward the gas depressurizing compressor 5, and a closed state, so as to prevent the passage of an amount of gas toward the gas depressurizing compressor 5.

Furthermore, the turbomachinery plant comprises a central control unit 7, connected to the first isolating valve SV1 and the second isolating SV2, the antisurge valve AV and the first on/off valve V1, and is configured to:

close the first isolating valve SV1 and the second isolating valve SV2 and open the antisurge valve AV, so that an amount of gas flows substantially only in the antisurge circuit AC, and open the first on/off valve V1 and activate the gas depressurizing compressor 5, so that an amount of gas that sucked by the gas depressurizing compressor 5 moves from the antisurge circuit AC to the gas depressurizing compressor 5 and the compressor 3 rotates encountering less resistance and absorbing less power and the power generated by the electrical reversible machine 21 is maximized.

Advantageously, the number of revolutions of the electrical reversible machine 21 can be increased so that the electrical reversible machine 21 can supply more power than an electrical reversible machine of a turbomachinery plant of known type.

The control central unit 7 can be a programmable controller that may be implemented by a microprocessor or a PLC along with an I/O module.

The gas sucked by the gas depressurizing compressor 5 is ejected on a fifth line L5 having a first end connected to the outlet 52 of the gas depressurizing compressor 5. In the embodiment being disclosed, the second end of the fifth line L5, opposite to the first end, is connected to the first line L1. Therefore, the amount of gas ejected from the gas depressurizing compressor 5 tends to return toward the suction unit SU.

However, it is not necessary that the outlet 52 of the gas depressurizing compressor 5 is connected to the first line L1. For example, the gas ejected from the gas depressurizing compressor 5 could be dispersed in the environment or directed to another part of the turbomachinery plant, for example to a vent header or to a gas treatment system.

With reference to the gas depressurizing compressor 5, the gas depressurizing compressor 5 is provided with adjusting means to adjust the flow rate of the gas depressurizing compressor itself.

As shown in FIG. 1, the central control unit 7 can be connected to the gas depressurizing compressor 5 and configured to control the adjusting means of the gas depressurizing compressor 5 so that the gas depressurizing compressor 5 absorbs as little power as possible.

Particularly, such adjusting means can comprise at least one valve (preferably two valves) arranged on one or more respective cylinders included in the gas depressurizing compressor 5 and the central control unit 7 is configured to control the flow rate of the gas depressurizing compressor 5 by adjusting the opening of the valve.

Furthermore, alternatively or in combination with the one or more valves arranged on respective cylinders, such adjusting means can comprise an electric device, for example a VFD electric motor, or mechanical device, for example a variable speed ratio gear box, to change the number of revolutions per minute of the gas depressurizing compressor 5 and the central control unit 7 is configured to control the flow rate of the gas depressurizing compressor by increasing/decreasing the number of revolutions per minute through the electric device or the mechanical device.

In the first embodiment being disclosed, the gas depressurizing compressor 5 is a volumetric machine.

Furthermore, as shown in FIG. 1, the antisurge circuit AC can comprise a cooler device 4 to cool the gas flowing in the third line L3 of the antisurge circuit AC. The cooler device 4 is provided with ventilation means 41 comprising one or more blades.

The central control unit 7 is connected to the cooler device 4 and configured to activate the cooler device 4.

Particularly, the central control unit 7 is configured to adjust the speed of the blades by means of a motor included in the cooler device 4, wherein the motor is connected to the ventilation means 41.

The motor can be a multipole motor comprising one or more pole couples or a VFD electric motor.

Alternatively, the central control unit 7 can be configured to adjust the speed of the blades by changing over time a value associated to the pitch angle of the blades by means of an hydraulic or electric or pneumatic or electro-mechanical actuator included in the cooler device 4. In the first embodiment being disclosed, the actuator is an electric actuator.

The cooler device 4 can be configured and sized depending on the needs, i.e. depending on the quantity of heat to be dissipated when the compressor 3 is in use.

Thus, the cooler device 4 is configured to dissipate a predetermined quantity of heat when the compressor 3 is in use.

Figure 2:
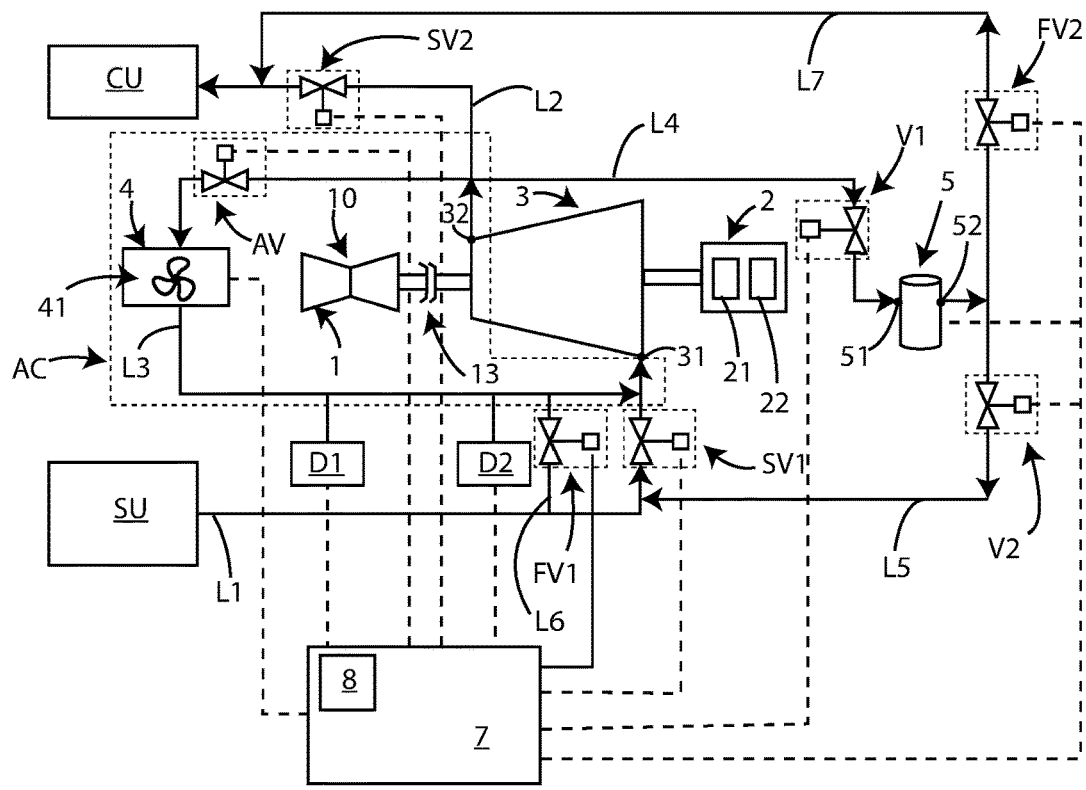
FIG. 2 illustrates a schematic view of the turbomachinery plant according to a second embodiment.
Figure 3:
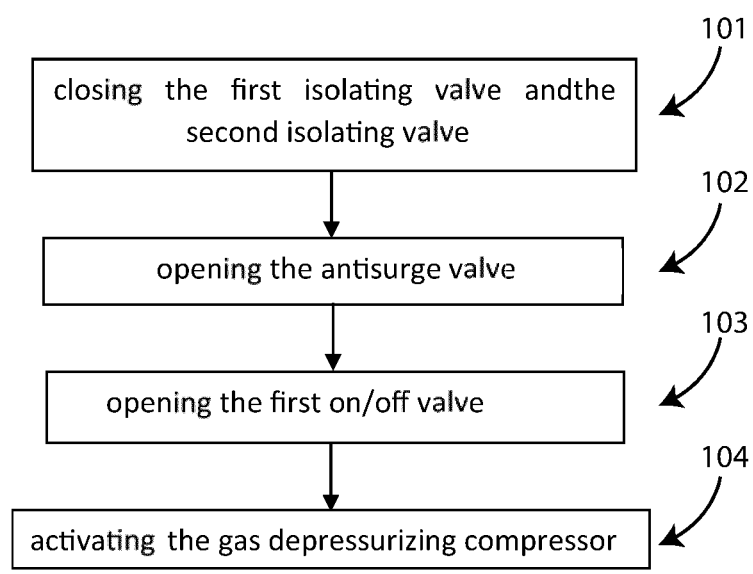
FIG. 3 illustrates a flow chart of a method for maximizing the power generated by an electrical reversible machine by reducing the power absorbed by a compressor connected to the electrical reversible machine.

FIG. 2 shows a second embodiment of the turbomachinery plant.

In the second embodiment, differently from the first embodiment, the turbomachinery plant further comprises:

a sixth line L6 connecting the first line L1 to the third line L3;

a first control valve FV1 arranged on the sixth line L6;

a seventh line L7 connecting the outlet 52 of the gas depressurizing compressor 5 to the second line L2, a second control valve FV2 arranged on the seventh line L7;

a measurement and control temperature device D1 configured to measure and control a temperature value referred to the amount of gas in the antisurge circuit AC.

The first control valve FV1 is movable between an open state, wherein it allows the passage of an amount of gas from the suction unit SU to the antisurge circuit AC, and a closed state, wherein it prevents the passage of an amount of gas from the suction unit SU to the antisurge circuit AC.

The second control valve FV2 is movable between an open state, wherein it allows the passage of an amount of gas from the gas depressurizing compressor 5 to the second line L2, and a closed state, wherein it prevents the passage of an amount of gas from the gas depressurizing compressor 5 to the second line L2.

According to the respective opening of each control valve FV1, FV2, the respective gas flow rate at the valve outlet can vary.

The measurement and control temperature device D1 is connected to the third line L3 between the cooler device 4 and the inlet 31 of the compressor 3.

Furthermore, the turbomachinery plant comprises storage means 8 (such as a memory) for storing data and the central control unit 7 is connected to the first control valve FV1, the second control valve FV2, the measurement and control temperature device D1, the storage means 8, and configured to:

store in the storage means 8 a predetermined temperature value;

acquire the temperature value from the measurement and control temperature device D1, and adjust the opening of the first control valve FV1 and the opening of the second control valve FV2, when the temperature value measured by the measurement and control temperature device D1 is greater than the predetermined temperature value, in such a way that an amount of gas with a first temperature enters the antisurge circuit AC through the first control valve FV1 and a second amount of gas having a second temperature exits the antisurge circuit AC, enters the gas depressurizing compressor 5, exits the gas depressurizing compressor 5 and reaches the second line L2 through the second control valve FV2, wherein the second amount of gas is equal to the first amount of gas and the second temperature is greater than the first temperature.

In other words, an amount of hot gas exits from the antisurge circuit AC and the same amount of fresh gas enters the antisurge circuit AC.

In the embodiment being disclosed, the central control unit 7 comprises the storage means 8. However, the storage means 8 can be outside the central control unit 7 without departing from the scope of the invention.

To improve the control of the opening of the first control valve FV1 and the second control valve FV2 based on the gas temperature value, it is possible to control the gas pressure to verify that the gas pressure value is equal to a predetermined gas pressure value.

To this end, the turbomachinery plant further comprises a measurement and control pressure device D2 configured to measure and control a pressure value referred to the gas in the antisurge circuit AC, and the central control unit 7 is connected to the measurement and control pressure device D2 and configured to:

store in the storage means 8 a predetermined pressure value;

acquire the pressure value from the measurement and control pressure device D2;

verify that the pressure value measured by the measurement and control pressure device D2 is equal to the predetermined pressure value, and if the pressure value is not equal to the predetermined pressure value, adjust the opening of the first control valve FV1 and the opening of the second control valve FV2 so that the pressure value of the gas in the antisurge circuit AC tends to be equal to the predetermined pressure value.

The measurement and control pressure device D2 is connected to the third line L3 of the antirsurge circuit AC between the cooler device 4 and the inlet 31 of the compressor 3. However, the measurement and control pressure device D2 can be connected to the third line L3 between the outlet 32 of the compressor 3 and the cooler device 4, without departing from the scope of the invention.

In the second embodiment, a second on/off valve V2 is arranged on the fifth line L5. Such a second on/off valve V2 is movable between an open state, so as to allow an amount of gas (i.e. the second amount of gas having a second temperature) ejected from the gas depressurizing compressor 5 to flow in the fifth line L5, and a closed state, so as to prevent an amount of gas (i.e. the second amount of gas having a second temperature) ejected from the gas depressurizing compressor from flowing in the fifth line L5, and the central control unit 8 is connected to the second on/off valve V2 and configured to close the second on/off valve V2 when adjusting the opening of the first control valve FV1 and the opening of the second control valve FV2 and open the second on/off valve V2 when the antisurge circuit AC is to be emptied.

In the second embodiment being disclosed, as already said for the first embodiment, the second end of the fifth line L5 is connected to the first line L1. Therefore, the second on/off valve V2 allows an amount of gas ejected from the gas depressurizing compressor 5 to reach the first line L1, when the second on/off valve V2 is in the open state, and prevents an amount of gas ejected from the gas depressurizing compressor 5 from reaching the first line L1, when the second on/off valve V2 is in the closed state.

With reference to each embodiment above disclosed, the compressor 3 is arranged between the gas turbine 10 of the gas turbine module 1 and the variable frequency drive unit 2, and the compressor 3 is preferably connected to the gas turbine 10 by means of a self synchronizing clutch 13.

A method for maximizing the power generated by an electrical reversible machine of a turbomachinery plant above disclosed, comprising the following steps:

closing 101 the first isolating valve SV1 and the second isolating valve SV2 and opening 102 the antisurge valve AV, so that an amount of gas flows substantially only in the antisurge circuit AC, and opening 103 the first on/off valve V1 and activating 104 the gas depressurizing compressor 5, so that an amount of gas sucked by the gas depressurizing compressor 5 moves from the antisurge circuit AC to the gas depressurizing compressor 5, the compressor 3 rotates encountering less resistance and absorbing less power and the power generated by the electrical reversible machine 21 is maximized.

An advantage of the present technical solution is to maximize the power generated by an electrical reversible machine 2, when the latter works as a generator to produce power. With the same overall power of the gas turbine 1, the power absorbed by the compressor 3 is less than a power absorbed by a compressor included in a turbomachinery plant of known type and then the power generated by the electrical reversible machine 2 is maximized. Furthermore, as a result, it is possible to increase the number of revolutions of the electrical reversible machine 2 so as to increase the capability of the electrical reversible machine to supply power.

Furthermore, a second advantage, due to the fact that the number of revolutions of the electrical reversible machine is increased, is that also the number of revolutions of the gas turbine can increase and then the rotation speed of the gas turbine can be increased, so that the gas turbine has an enhanced efficiency. In fact, the gas turbine efficiency is improved of a value in percentage terms between 2% and 4%

A third advantage is that it is possible to maximize the power generated by an electrical reversible machine by means of a technical solution having a low manufacturing cost with respect to the advantage that can be obtained. Therefore, the operating expenditure and capital expenditure for this technical solution are reduced with respect to a turbomachinery plant of known type.

Another advantage is given by the possibility to use a mechanical drive hybrid gas turbine.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A turbomachinery plant comprising: a variable frequency drive electric unit comprising an electrical reversible machine capable of generating power; a first compressor, connected to the electrical reversible machine; a suction unit; a first line connecting the suction unit to the first compressor; a first isolating valve arranged on the first line; a gas collection unit; a second line connecting the first compressor to the gas collection unit; a second isolating valve arranged on the second line; an antisurge circuit comprising a third line, connecting the first line to the second line, and an antisurge valve arranged on the third line; the turbomachinery plant further comprises: a gas depressurizing compressor having an inlet and an outlet and configured to suck an amount of gas through the inlet, to decrease the pressure of the amount of gas and to eject the amount of gas through the outlet; a fourth line connecting the second line to the inlet of the gas depressurizing compressor; a first on/off valve arranged on the fourth line movable between an open state, so as to allow passage of the amount of gas toward the gas depressurizing compressor, and a closed state, so as to prevent passage of the amount of gas toward the gas depressurizing compressor; a central control unit, connected to the first isolating valve and the second isolating valve, the antisurge valve, the first on/off valve, and configured to: close the first isolating valve and the second isolating valve and open the antisurge valve, so that the amount of gas flows substantially only in the antisurge circuit, and open the first on/off valve and activate the gas depressurizing compressor, so that an amount of gas sucked by the gas depressurizing compressor moves from the antisurge circuit to the gas depressurizing compressor, the first compressor rotates encountering less resistance and absorbing less power and the power generated by the electrical reversible machine is maximized.

2. The turbomachinery plant according to claim 1, wherein the antisurge circuit comprises a cooler device and the central control unit is connected to the cooler device and configured to activate the cooler device.

3. The turbomachinery plant according to claim 2, wherein the cooler device is provided with ventilation means comprising one or more blades, and the central control unit is configured to adjust a speed of the blades by means of a motor included in the cooler device, wherein the motor is connected to the ventilation means.

4. The turbomachinery plant according to claim 3, wherein the motor is a multipole motor comprising one or more pole couples or a VFD electric motor.

5. The turbomachinery plant according to claim 2, wherein the cooler device is provided with ventilation means comprising one or more blades and the central control unit is configured to adjust a speed of the blades by changing a value associated to a pitch angle of the blades by means of an actuator included in the cooler device, wherein the actuator is one of a hydraulic pneumatic actuator or an electric actuator or a mechanical actuator or an electro-mechanical actuator.

6. The turbomachinery plant according to claim 2, wherein the cooler device is configured and sized to dissipate a predetermined quantity of heat.

7. The turbomachinery plant according to claim 2, wherein the turbomachinery plant further comprises: a sixth line connecting the first line to the third line; a first control valve arranged on the sixth line and movable between an open state, so as to allow a passage of an amount of gas from the suction unit to the first compressor, and a closed state, so as to prevent the passage of the amount of gas from the suction unit to the first compressor; a seventh line connecting the outlet of the gas depressurizing compressor to the second line; a second control valve arranged on the seventh line and movable between an open state, so as to allow a passage of an amount of gas from the first compressor to the gas collection unit, and a closed state, so as to prevent the passage of the amount of gas from the first compressor to the gas collection unit; a measurement and control temperature device configured to measure and control a temperature value referred to the amount of gas in the antisurge circuit, the measurement and control temperature device being connected to the third line between the cooler device and an inlet of the first compressor; storage means for storing data; wherein the central control unit is connected to the first control valve, the second control valve, the measurement and control temperature device and the storage means, and configured to: store in the storage means a predetermined temperature value; acquire the temperature value from the measurement and control temperature device, and adjust an opening of the first control valve and an opening of the second control valve, when the temperature value measured by the measurement and control temperature device is greater than the predetermined temperature value, such that a first amount of gas having a first temperature enters the antisurge circuit through the first control valve and a second amount of gas having a second temperature exits the antisurge circuit, enters the gas depressurizing compressor, exits the gas depressurizing compressor and reaches the second line through the second control valve, wherein the second amount of gas is equal to the first amount of gas and the second temperature is greater than the first temperature.

8. The turbomachinery plant according to claim 7, wherein the turbomachinery plant further comprises: a measurement and control pressure device configured to measure and control a pressure value referred to the gas in the antisurge circuit, the measurement and control pressure device being connected to the third line; wherein the central control unit is connected to the measurement and control pressure device and configured to: store in the storage means a predetermined pressure value; acquire the pressure value from the measurement and control pressure device; verify that the pressure value measured by the measurement and control pressure device is equal to the predetermined pressure value; if the pressure value is not equal to the predetermined pressure value, adjust the opening of the first control valve and the opening of the second control valve so that the pressure value of the gas in the antisurge circuit tends to be equal to the predetermined pressure value.

9. The turbomachinery plant according to claim 7, wherein the turbomachinery plant comprises: a fifth line having a first end connected to the outlet of the gas depressurizing compressor, and a second on/off valve arranged on the fifth line and movable between an open state, so as to allow the amount of gas ejected from the gas depressurizing compressor to flow in the fifth line, and a closed state, so as to prevent the amount of gas ejected from the gas depressurizing compressor from flowing in the fifth line; wherein the central control unit is connected to the second on/off valve and configured to: close the second on/off valve when adjusting the opening of the first control valve and the opening of the second control valve, and open the second on/off valve when the antisurge circuit is to be emptied.

10. The turbomachinery plant according to claim 9, wherein the fifth line has a second end, opposite to the first end, connected to the first line, and the second on/off valve allows the amount of gas ejected from the gas depressurizing compressor to reach the first line, when the second on/off valve is in the open state, and prevents the amount of gas ejected from the gas depressurizing compressor from reaching the first line, when the second on/off valve is in the closed state.

11. The turbomachinery plant according to claim 1, wherein the gas depressurizing compressor is provided with adjusting means to adjust a flow rate of the gas depressurizing compressor and/or a number of revolutions per minute of the gas depressurizing compressor and the central control unit is connected to the gas depressurizing compressor and configured to control the adjusting means of the gas depressurizing compressor, so that the gas depressurizing compressor absorbs as little power as possible.

12. The turbomachinery plant according to claim 11, wherein the adjusting means comprises at least one valve arranged on one or more respective cylinders included in the gas depressurizing compressor and the central control unit is configured to control the flow rate of the gas depressurizing compressor by adjusting an opening of the at least one valve of the adjusting means.

13. The turbomachinery plant according to claim 11, wherein the adjusting means comprise an electric device or a mechanical device to change the number of revolutions per minute of the gas depressurizing compressor and the central control unit is configured to control the flow rate of the gas depressurizing compressor by increasing/decreasing the number of revolutions per minute of the gas depressurizing compressor through the electric device or the mechanical device.

14. The turbomachinery plant according to claim 1, wherein the turbomachinery plant comprises a turbine gas module comprising a gas turbine and the first compressor is arranged between the gas turbine module and the variable frequency drive unit, the first compressor being connected to the gas turbine by means of a self synchronizing clutch.

15. A method for maximizing a power generated by an electrical reversible machine of a turbomachinery plant, wherein the turbomachinery plant comprises a first compressor connected to the electrical reversible machine, a suction unit, a first line connecting the suction unit to the first compressor, a first isolating valve arranged on the first line, a gas collection unit, a second line connecting the first compressor to the gas collection unit, a second isolating valve arranged on the second line, an antisurge circuit comprising a third line connecting the first line to the second line and an antisurge valve arranged on the third line, a gas depressurizing compressor having an inlet and an outlet and configured to suck an amount of gas through the inlet, decrease the pressure of the amount of gas and eject the amount of gas through the outlet, a fourth line connecting the second line to the inlet of the gas depressurizing compressor, a first on/off valve arranged on the fourth line and movable between an open state, so as to allow passage of the amount of gas toward the gas depressurizing compressor, and a closed state, so as to prevent passage of the amount of gas toward the gas depressurizing compressor, the method comprising the following steps: closing the first isolating valve and the second isolating valve and opening the antisurge valve, so that the amount of gas flows substantially only in the antisurge circuit, and opening the first on/off valve and activating the gas depressurizing compressor, so that the amount of gas sucked by the gas depressurizing compressor moves from the antisurge circuit to the gas depressurizing compressor, the first compressor rotates encountering less resistance and absorbing less power and the power generated by the electrical reversible machine is maximized.

* * * * *